(12) United States Patent
Varshney et al.

(10) Patent No.: US 11,989,245 B2
(45) Date of Patent: May 21, 2024

(54) SYSTEMS AND METHODS FOR PROCESSING SUBJECTIVE QUERIES

(71) Applicant: Rovi Guides Inc., San Jose, CA (US)

(72) Inventors: Prateek Varshney, Karnataka (IN); Madhusudhan Seetharam, Bangalore (IN); Vishwas Sharadanagar Panchaksharaiah, Karnataka (IN)

(73) Assignee: ROVI GUIDES, INC., San Jose, CA (US)

(*) Notice: Subject to any disclaimer, the term of this patent is extended or adjusted under 35 U.S.C. 154(b) by 0 days.

(21) Appl. No.: 18/097,768

(22) Filed: Jan. 17, 2023

(65) Prior Publication Data

US 2023/0244734 A1    Aug. 3, 2023

Related U.S. Application Data

(63) Continuation of application No. 16/359,612, filed on Mar. 20, 2019, now Pat. No. 11,580,183.

(51) Int. Cl.
*G06F 16/90* (2019.01)
*G06F 9/451* (2018.01)
*G06F 16/9535* (2019.01)
*G06F 16/9536* (2019.01)
*G06F 16/9537* (2019.01)
*G06F 16/9538* (2019.01)

(52) U.S. Cl.
CPC .......... *G06F 16/9536* (2019.01); *G06F 9/453* (2018.02); *G06F 16/9535* (2019.01); *G06F 16/9537* (2019.01); *G06F 16/9538* (2019.01)

(58) Field of Classification Search
None
See application file for complete search history.

(56) References Cited

U.S. PATENT DOCUMENTS

| 5,862,223 | A | * | 1/1999 | Walker ................ G06Q 20/383 |
| | | | | 705/50 |
| 6,193,518 | B1 | | 2/2001 | Nocera |
| 8,538,960 | B2 | | 9/2013 | Nabar et al. |
| 11,580,183 | B2 | | 2/2023 | Varshney et al. |
| 2013/0036114 | A1 | * | 2/2013 | Wong .................. G06F 16/9535 |
| | | | | 707/E17.141 |
| 2013/0304758 | A1 | | 11/2013 | Gruber et al. |
| 2014/0214820 | A1 | | 7/2014 | Odonnell |
| 2014/0310614 | A1 | | 10/2014 | Jones |
| 2015/0149462 | A1 | * | 5/2015 | Biyani .............. G06F 16/24578 |
| | | | | 707/737 |
| 2016/0259824 | A1 | * | 9/2016 | Livshits ............ G06F 16/24542 |
| 2016/0371276 | A1 | | 12/2016 | Furtado et al. |
| 2020/0030198 | A1 | | 9/2020 | Varshney et al. |

* cited by examiner

*Primary Examiner* — Belix M Ortiz Ditren
(74) *Attorney, Agent, or Firm* — HALEY GUILIANO LLP

(57) ABSTRACT

Methods and systems for processing subjective queries are described. A query is received from a user. The method involves determining whether the query is subjective. In response to determining that the query is subjective, a plurality of people qualified to answer the query are identified. Moreover, a subset of the plurality of people who are available to answer the query are identified, and the query is transmitted to the subset of people available to answer the query. The received responses to the transmitted query from each of the people in the subset are then generated for display.

20 Claims, 9 Drawing Sheets

SYSTEMS AND METHODS FOR PROCESSING SUBJECTIVE QUERIES

CROSS-REFERENCE TO RELATED APPLICATIONS

This application is a continuation of U.S. patent application Ser. No. 16/359,612, filed Mar. 20, 2019, the disclosure of which is hereby incorporated by reference herein in its entirety.

BACKGROUND

This disclosure is generally directed to processing queries. In particular, methods and systems are provided for processing queries that are subjective.

SUMMARY

A wide range of interactive devices have been developed to assist users in processing user queries more accurately. These interactive devices include, for example, mobile devices, tablets, computers, smart television systems, and the like. With the increase in popularity of digital assistants, users are becoming increasingly reliant on such devices to answer everyday queries. These interactive devices typically access various search engines to answer the user queries. However, users often desire answers to queries that are subjective that cannot be searched for on various search engines. For example, if a user wants to know whether they should visit a particular destination, the interactive devices that rely on search engines to answer queries are able to provide only generic facts about the destination, which may not be as helpful to the user. Typically, in such circumstances, the user may have to seek out friends or family members and ask for their opinion. However, the user may not be aware of people within their own social circles who have visited the particular destination of interest. Moreover, even if the user is aware of people who have visited the destination, these people might not be available to answer the questions at the time. In such instances, the user seeking an answer may be inconveniencing the people qualified to answer the query, therefore making it less likely that the user will receive a response.

It is desirable, therefore, to process these subjective queries without interrupting people who are either unqualified or are unavailable to answer the queries at the time. Additionally, seeking out opinions to subjective queries typically involves the user asking other people directly. The queries, however, may be time-sensitive, and receiving an answer at a later time may not be of use to the user asking the question.

Accordingly, to overcome these problems, systems and methods are provided herein for processing subjective queries. Systems and methods described herein provide control circuitry that assists users in answering subjective queries by first identifying a plurality of people who are qualified to answer the query and then identifying a subset of the plurality of people who are available to answer the query at the time the query is asked.

The system, upon receiving a query from a user, determines whether the query is subjective. This determination may be made by, for example, comparing the words in the query against a database storing words commonly associated with subjective queries. The system, in response to determining that the query is subjective, identifies a plurality of people qualified to answer the query. In one implementation, the system may compare the words from the query with social media posts of people associated with the user to identify people associated with the user who are qualified to answer the query. For example, when a user wishes to know whether they should go climb Machu Pichu, the system may search social media posts of the people in the user's contact list to identify people who have previously referenced climbing Machu Pichu in their respective social media posts.

In another implementation, the system may identify the geographical location referenced in the query (e.g., Machu Pichu, Peru, etc.) and cross-reference it with the geographical location information of people associated with the user. For instance, the system may identify one or more people who have visited Machu Pichu within a predetermined period of time to ensure that the answers they provide are more reliable.

The system further identifies a subset of the plurality of people who are available to answer the query. For example, the system may retrieve availability information corresponding to the plurality of people. In one implementation, the availability information is retrieved from an electronic device such as a smartphone associated with each of the plurality of people. The system analyzes the retrieved availability information (e.g., from a calendar) to identify the subset of people that are available for a predetermined period of time after the query was received. This avoids the user interrupting other people who might be otherwise busy (e.g., in a meeting) and would therefore be less inclined to answer the query.

The system transmits the query to the subset of people available to answer the query and waits for the responses. For example, the subset of people determined to be both qualified to answer the query and available to answer the query may receive the query on one or more electronic devices such as the interactive devices mentioned above. The responses to the queries are relayed back to the user and generated for display by one or more interactive devices associated with the user. For example, a digital assistant belonging to the user may announce the responses received from other people regarding their respective experiences climbing Machu Pichu.

In this way, the system provides answers to subjective queries without requiring user input and without inconveniencing people associated with the user. By identifying people associated with the user who are both qualified to answer the query and are available to answer the query, the system is able to answer subjective queries. This improvement is particularly relevant when requesting answers to queries that are time sensitive, as the system is able to identify the best candidates to answer the query in a more efficient and unobtrusive manner.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems in accordance with the present disclosure are described herein for processing subjective queries received from a user. For example, a user, Bob, getting ready for work may wish to know how he looks and asks his digital assistant (e.g., user equipment 302, 304, 306 discussed later with reference to FIGS. 2 and 3) the question "How do I look?" The digital assistant may analyze the user's list of contacts and automatically identify a subset of people who are both qualified and available to answer the question at the time the query is processed by the digital assistant. For example, the digital assistant may determine that Bob's wife and children are appropriately qualified to answer the query and may further determine that Bob's wife is currently unavailable to answer the query. The digital assistant may then send the query only to Bob's children and relay their responses back to Bob.

Figure 1:
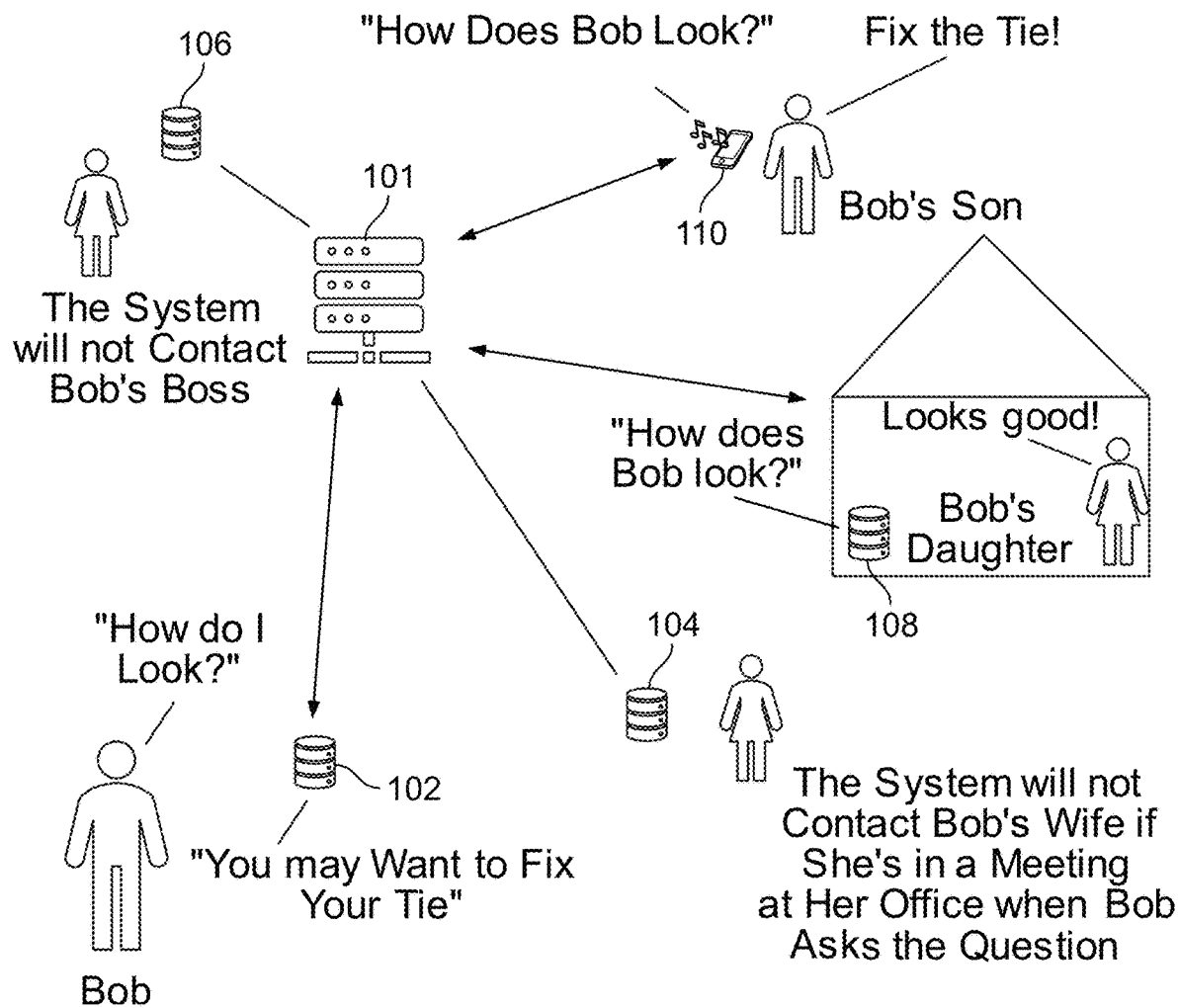
FIG. 1 shows an illustrative system diagram in which a subjective query is processed and answered, in accordance with some embodiments of the disclosure.

FIG. 1 shows an illustrative depiction of a system 100 for processing a subjective query in accordance with an embodiment of the present disclosure. Although FIG. 1 depicts first, second, third, and fourth user equipment devices 102, 104, 106, and 108 as digital assistants and fifth user equipment device 110 as a mobile phone, it will be understood that any suitable device for displaying and distributing content may be used, such as user television equipment 302, user computer equipment 304, and/or wireless user communications device 306 discussed below in relation to FIG. 3. User equipment devices 102-110 may have control circuitry (e.g., control circuitry 204 discussed later in more detail with reference to FIG. 2) configured to display the query and/or the received responses to the query (e.g., display 212 or speakers 214 discussed later in more detail with reference to FIG. 2) at one or more of user equipment devices 102-110.

FIG. 1 shows an illustrative system 100 for processing and answering a subjective query, in accordance with some embodiments of the disclosure. System 100 includes a server device 101, first user equipment device 102 (e.g., a first digital assistant associated with a first user), second user equipment device 104 (e.g., a second digital assistant associated with a second user), third user equipment device 106 (e.g., a third digital assistant associated with a third user), fourth user equipment device 108 (e.g., a fourth digital assistant associated with a fourth user), and fifth user equipment device 110 (e.g., a mobile phone associated with a fifth user). Although FIG. 1 depicts first, second, third, and fourth user equipment devices 104-108 as digital assistants, and fifth user equipment device 110 as a mobile phone, it will be understood that any suitable device for displaying and distributing content may be used, such as user television equipment 302, user computer equipment device 304, and/or wireless user communications device 306 discussed below in relation to FIG. 3. User equipment devices 102-110 may have control circuitry (e.g., control circuitry 204 discussed later in more detail with reference to FIG. 2) configured to process a received query and generate for display the responses to the received query (e.g., on a display such as display 212 or via speakers 214 discussed later in more detail with reference to FIG. 2).

As shown in FIG. 1, first user equipment device 102 receives a query from a user Bob. In the example illustrated in FIG. 1, the first user equipment device 102 receives the query "How do I look?" The first user equipment device 102 processes the received query to determine whether the query is subjective. For example, the first user equipment device 102 may extract the words from the received query and compare them against a database 900 (discussed in further detail with reference to FIGS. 5 and 9) storing a list of words associated with subjective queries to identify a match. In the example system shown in FIG. 1, the first user equipment device 102 may extract the words "how" and "look" and search for those words in the database 900. A person skilled in the art will understand that the received query may be processed at the first user equipment device 102 and/or the server device 101. The database storing a list of words associated with subjective queries may be stored at the first user equipment device 102 and/or the server 101 or at any of the other user equipment devices 104-110.

Responsive to determining that the received query is subjective (e.g., by determining that the words "how" and "look" are in the database 900), the first user equipment device 102 identifies a plurality of people qualified to answer the query based on, for instance, the social relationship between the user asking the query and the people associated with the user asking the query. For example, first user equipment device 102, via its control circuitry, may determine that Bob's boss may not be appropriately qualified to answer the query. Similarly, first user equipment device 102 may determine that Bob's wife, son, and daughter are appropriately qualified to answer the received query. In various embodiments, first user equipment device 102 may rely on the user's contact list to identify the plurality of people qualified to answer the query. In some embodiments, first user equipment device 102 may analyze the social media profiles and/or geographical location information to identify people qualified to answer the query. Identification of people qualified to answer the subjective query is discussed in more detail below with reference to FIGS. 6 and 7.

First user equipment device 102 further identifies a subset of the plurality of people who are available to answer the subjective query. For example, first user equipment device 102 may determine that Bob's wife is in a meeting at the time the query is received and is therefore unavailable to answer the query. Similarly, first user equipment device 102 may determine, based on, for instance, the schedule information of the plurality of people determined to be qualified to answer the query, that only Bob's son and daughter are both qualified and available to answer the subjective query.

In some embodiments, first user equipment device 102 may retrieve the respective calendar information associated with each of the people in the subset via their associated user equipment devices 104, 108, and 110. In some embodiments, the server device 101 may collect the calendar information from the user equipment devices 104, 108, and 110 and return availability information to first user equipment device 102.

Once first user equipment device 102 identifies the subset of people determined to be both qualified and available to answer the received query, first user equipment device 102 may transmit the query to one or more user equipment devices (e.g., fourth and fifth user equipment devices 108 and 110) associated with each of the people in the subset (e.g., Bob's son and daughter). In some embodiments, first user equipment device 102 may determine the delivery method for transmitting the query to the subset of people. For example, first user equipment device 102 may determine that Bob's daughter is at home and transmit the query via a digital assistant in an audible form with an accompanying image of Bob. Similarly, when first user equipment device 102 determines that Bob's son is outside, the query is transmitted to his mobile device in textual form with an accompanying image of Bob instead.

First user equipment device 102 receives a response to the transmitted query from fourth user equipment device 108 and fifth user equipment device 110. In the example shown in FIG. 1, Bob's daughter may respond by saying "Looks good!" while Bob's son may respond by texting "Fix the tie!" As shown in FIG. 1, the responses to the transmitted query are sent to first user equipment device 102 via server device 101. In some embodiments, the server device 101 may be omitted and the response from the fourth and fifth user equipment devices 108, 110 may be directly communicated to first user equipment device 102.

First user equipment device 102, upon receiving the responses to the transmitted queries, generates for display each received response from the subset of people. In various embodiments, first user equipment device 102 may display each received response in audible form via, for example, speakers 214 (discussed below) or display the received responses on a display screen (e.g., a display 212 discussed below). The user, Bob, is therefore able to receive an answer to his subjective query without needing to contact people who either are not qualified to answer the query (e.g., his boss) or are otherwise unavailable and therefore less likely to respond to the query (e.g., his wife).

Figure 2:
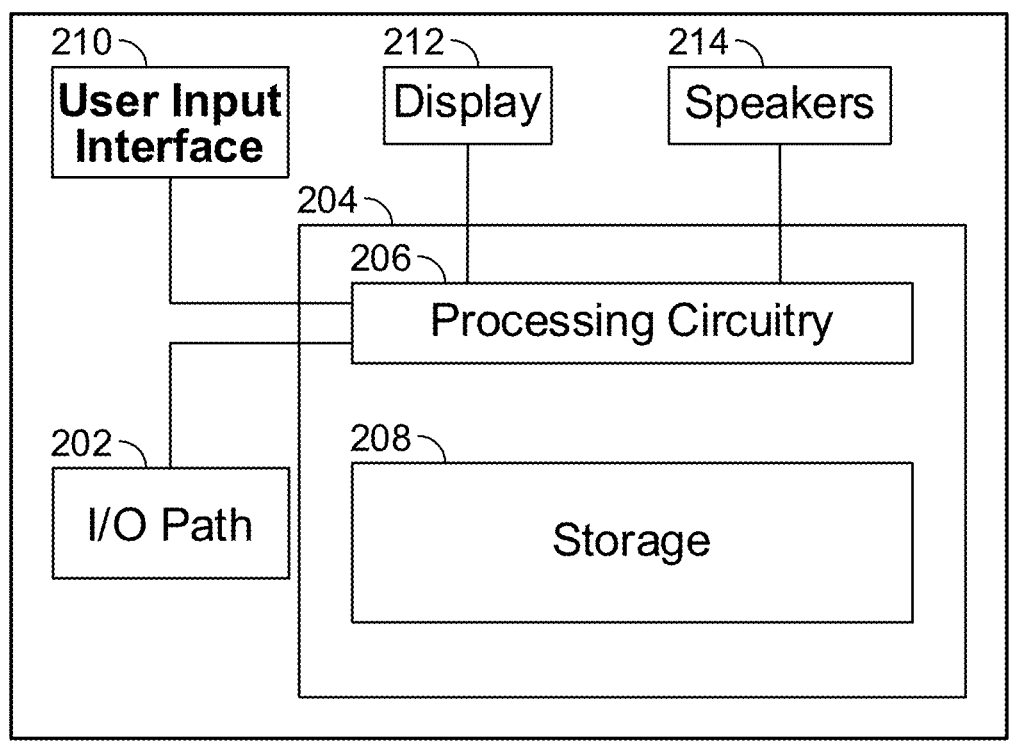
FIG. 2 shows an illustrative block diagram of a system for processing subjective queries, in accordance with some embodiments of the disclosure.

FIG. 2 depicts a generalized embodiment of an illustrative device (e.g., user equipment devices 102, 104, 106) that process subjective queries. User equipment device 200 may be any of a plurality of user devices such as a smartphone, a tablet, personal computer, set-top box, etc. (discussed further below with respect to FIG. 3). User equipment device 200 may receive data via input/output (hereinafter "I/O") path 202. I/O path 202 may provide data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below in relation to FIG. 3). I/O functions may be provided by one or more of these communications paths but are shown as a single path in FIG. 2 to avoid overcomplicating the drawing.

Control circuitry 204 may be based on any suitable processing circuitry such as processing circuitry 206. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 204 executes instructions for an application stored in memory (e.g., memory 208). Specifically, control circuitry 204 may be instructed by a media application to perform the functions discussed above and below. In some implementations, any action performed by control circuitry 204 may be based on instructions received from the media application.

Control circuitry 204 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 208) may also be provided. Control circuitry 204 may also include scaler circuitry for upconverting and downconverting content into the preferred output format of user equipment device 200, and converter circuitry for converting between digital and analog signals. The tuning and encoding circuitry may be used by user equipment device 200 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 208 is provided as a separate device from user equipment device 200, the tuning and encoding circuitry may be associated with storage 208.

Storage 208 may be any device for storing electronic data, such as random-access memory, solid state devices, quantum storage devices, hard disk drives, non-volatile memory or any other suitable fixed or removable storage devices, and/or any combination of the same. Control circuitry 204 may allocate portions of storage 208 for various purposes such as caching application instructions, recording media assets, storing portions of a media asset, buffering segments of media, etc. As described herein, storage 208 may be used to store one or more LUTs storing a number of MAC addresses associated with a plurality of user equipment devices and their corresponding profile information.

A user may send instructions to control circuitry 204 using user input interface 210. User input interface 210 may be any suitable user input interface, such as a remote control, mouse, trackball, keypad, keyboard, touch screen, touchpad, stylus input, joystick, voice recognition interface, or other user input interfaces. Instructions to control circuitry 204 may be transmitted through I/O path 202, that could consist of a video tracking and detection mechanism, Internet of Things (IoT) and home automation triggers, emergency alert systems, and software or hardware communication pipelines and/or notification centers.

Display 212 may be provided as a stand-alone device or integrated with other elements of each one of user equipment device 200. For example, display 212 may be a touchscreen or touch-sensitive display, a projector, or a casting device. In such circumstances, user input interface 210 may be integrated with or combined with display 212. Display 212 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 212. In some embodiments, the graphics processing circuitry may be external to processing circuitry 206 (e.g., as a graphics processing card that communicates with processing circuitry 206 via I/O path 202) or may be internal to processing circuitry 206 or control circuitry 204 (e.g., on a same silicone die as control circuitry 204 or processing circuitry 206). In some embodiments, the graphics processing circuitry may be used to receive, display, and play content.

Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214. The speakers 214 may be part of, but not limited to, a home automation system.

The media application may be implemented using any suitable architecture. For example, it may be a stand-alone application wholly implemented on user equipment device 200. The user interface application and/or any instructions for performing any of the embodiments discussed herein may be encoded on computer-readable media. Computer-readable media includes any media capable of storing data.

Figure 3:
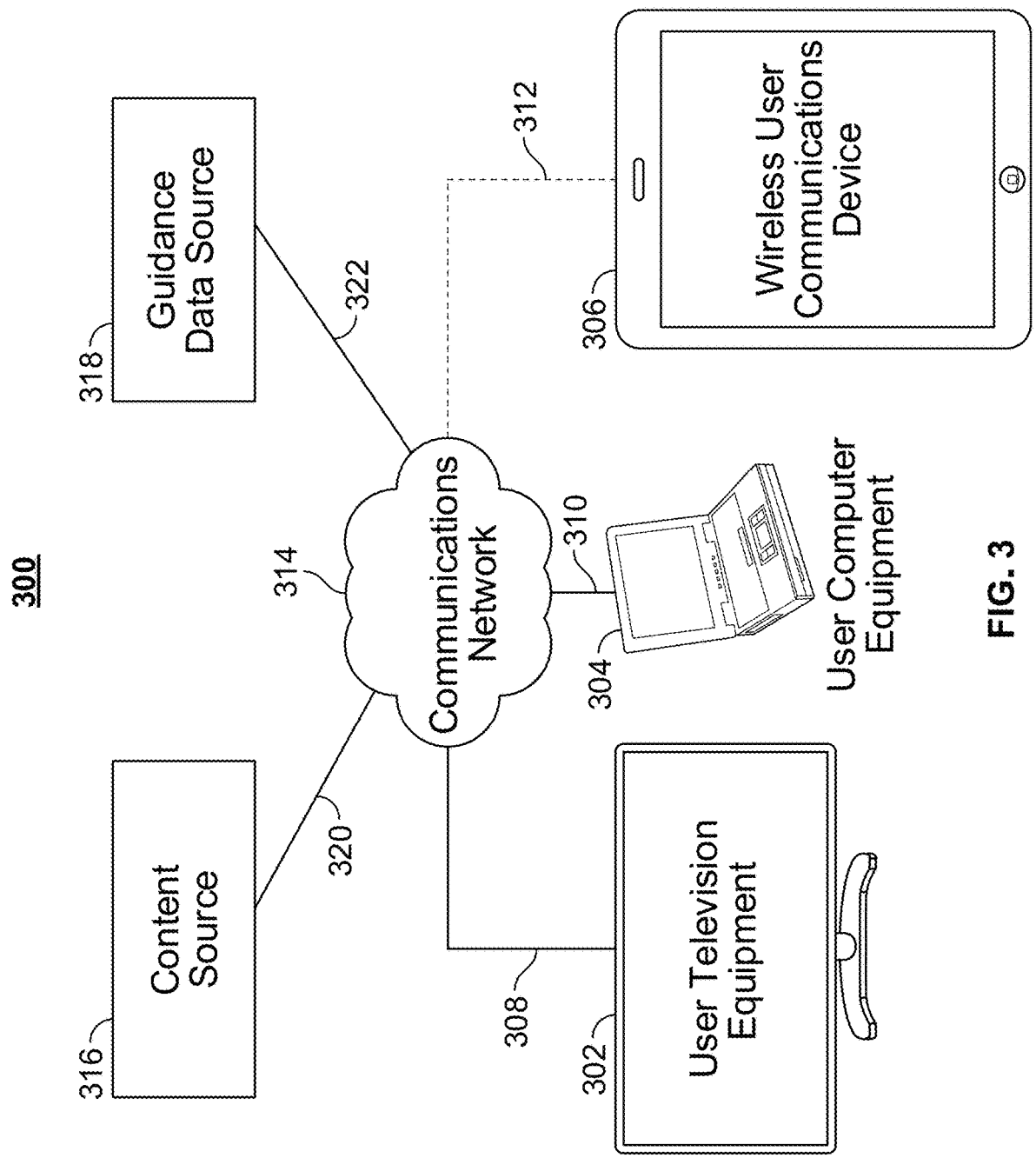
FIG. 3 shows an illustrative block diagram showing additional details of the system of FIG. 2, in accordance with some embodiments of the disclosure.

FIG. 3 depicts an exemplary media system in accordance with some embodiments of the disclosure in which user equipment devices 102, 104, 106, and user equipment device 200 can be implemented in system 300 of FIG. 3 as user television equipment 302, user computer equipment 304, wireless user communications device 306, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 302 may include a set-top box, an integrated receiver decoder (IRD) for handling satellite television, a television set, a digital storage device, or other user television equipment. One or more of these devices may be integrated to be a single device, if desired. User computer equipment 304 may include a PC, a laptop, a streaming content aggregator, a PC media center, or other user computer equipment. It may include devices like digital assistance, smart speakers, and/or home automation. Wireless user communications device 306 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 300, there is typically more than one of each type of user equipment but only one of each is shown in FIG. 3 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, ad-hoc network, cable network, or other types of communications network or combination of communications networks. Paths 308, 310, and 312 may separately or together include one or more communications paths, including any suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths). Communications with the user equipment may be provided by one or more of these communications paths but are shown as a single path in FIG. 3 to avoid overcomplicating the drawing. The user equipment devices may communicate with each other directly through an indirect path via communications network 314 or through a direct path using a device-to-device network (e.g., wired connection such as an Ethernet connection).

System 300 includes content source 316 and guidance data source 318 coupled to communications network 314 via communications paths 320 and 322, respectively. Paths 320 and 322 may include any of the communications paths described above in connection with paths 308, 310, and 312. Communications with the content source 316 and guidance data source 318 may be exchanged over one or more communications paths but are shown as a single path in FIG. 3 to avoid overcomplicating the drawing. In addition, there may be more than one of each of content source 316 and guidance data source 318, but only one of each is shown in FIG. 3 to avoid overcomplicating the drawing. In some embodiments, content source 316 and guidance data source 318 are integrated as one source device. Although communications between sources 316 and 318 with user equipment 302, 304, and 306 are shown as through communications network 314, in some embodiments, sources 316 and 318 may communicate directly with user equipment devices 302, 304, and 306 via communications paths (not shown) such as those described above in connection with paths 308, 310, and 312.

Content source 316 may include one or more types of media distribution equipment such as a media server, cable system headend, satellite distribution facility, intermediate distribution facilities and/or servers, Internet providers, on-demand media servers, and other media providers. Content source 316 may be the originator of media content or may not be the originator of media content. Content source 316 may also include a remote media server used to store different types of media content (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

Guidance data source 318 may provide media guidance data, such as data related to a media asset or profile of a user. Guidance data may be provided to the user equipment using any suitable approach such as via a data feed or by querying a database of guidance data source 318. For example, control circuitry 204 may transmit a query to a database of guidance data source 318 comprising a command to retrieve metadata and an identifier uniquely representing a media asset. In response to transmitting the query, control circuitry 204 may receive a response from the database comprising metadata for the media asset uniquely represented by the identifier.

System 300 is intended to illustrate a number of approaches, or network configurations, by which user equipment devices and sources of media content and guidance data may communicate with each other for the purpose of accessing media and data related to the media. The configuration of the devices and paths in system 300 may change without departing from the scope of the present disclosure.

Figure 4:
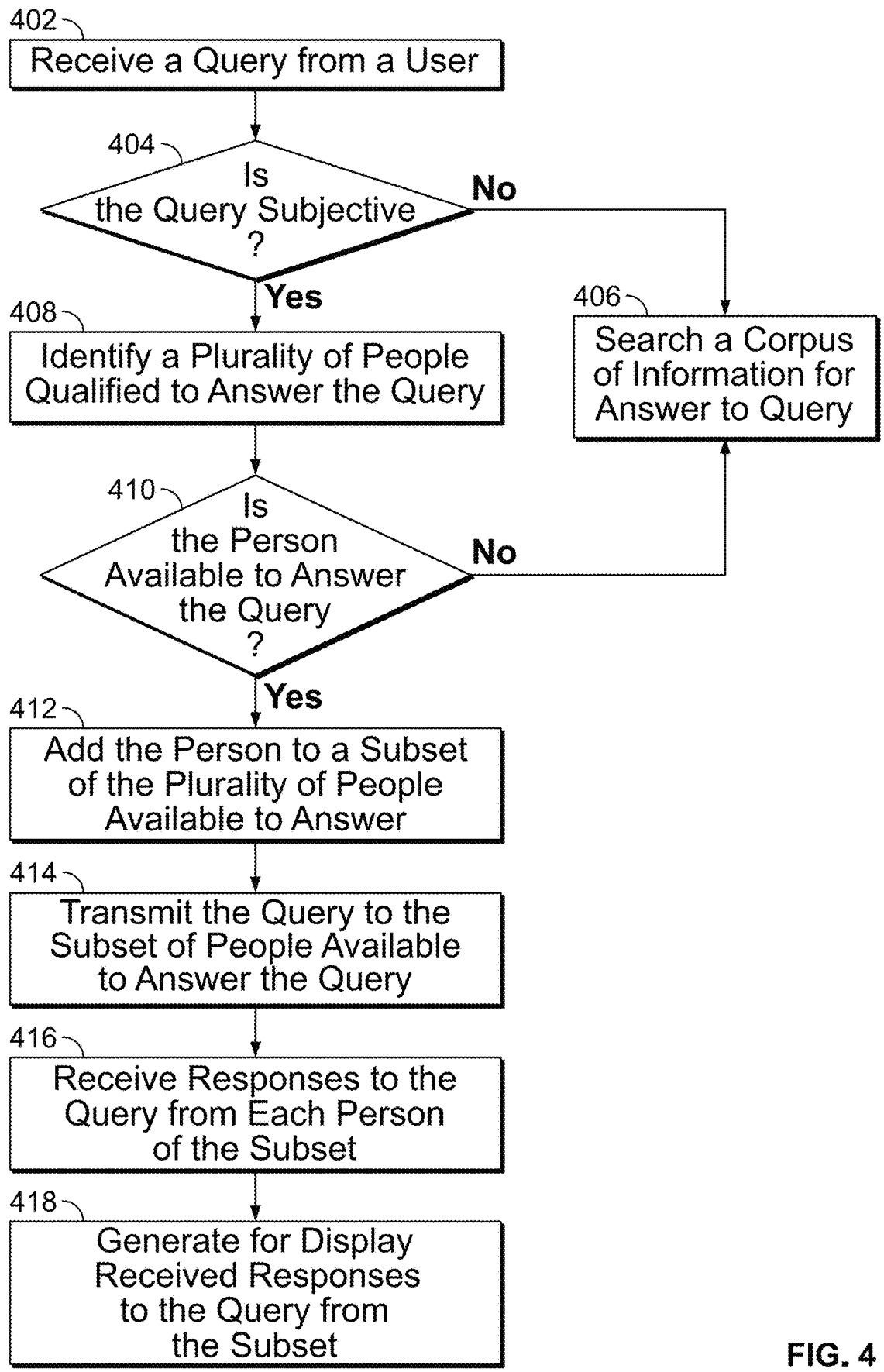
FIG. 4 depicts an illustrative flowchart of a process for processing subjective queries, in accordance with some embodiments of the disclosure.

Having described system 300, reference is now made to FIG. 4, which depicts an illustrative flowchart of a process 400 for processing subjective queries, in accordance with some embodiments of the disclosure. In various embodiments, individual steps of process 300 may be implemented by one or more components of system 100. Although the present disclosure may describe certain steps of process 400 (and of other processes described herein) as being implemented by certain components of system 200, this is for purposes of illustration only, and it should be understood that other components of system 200 may implement those steps instead. For example, steps of process 400 may be executed by server device 101 and/or by user equipment devices 102-110 for processing subjective queries and identifying people both qualified and available to answer the queries.

As described above, control circuitry 204 of first user equipment device 102 receives a query from a user at 402 via user input interface 210. In some embodiments, the received query may be a voice input and may be received by a digital assistant. Additionally, based on an analysis of the received query, first user equipment device 102 may also obtain an image of the user in order to appropriately process the received query.

At 404, control circuitry 204 of first user equipment device 102 determines whether the received query is subjective. Additional details regarding how the received query is processed to determine whether the query is subjective are provided below in the context of FIG. 5. In general, control circuitry 204 of first user equipment device 102 analyzes the words in the query to determine whether they are indicative of a subjective query. For example, control circuitry 204, in one embodiment, may compare the words in the received query to a database storing a list of words indicative of a subjective query. In such an example, if control circuitry 204 of first user equipment device 102 identifies one or more words from the query that match words stored in the database, the first user equipment device 102 determines that the query is subjective. Alternatively, or in addition to the above, control circuitry 204 of first user equipment device 102 may use a classifier, which is trained by maintaining a record for each query for which objective results are found in a corpus of information.

If, at 404, it is determined that the received query is not subjective, process 400 proceeds to 406, and control circuitry 204 of first user equipment device 102 may search a corpus of information for objective answers to the query. For instance, in an example where the received query is "Which basketball team plays at Madison Square Garden?" control circuitry 204 of first user equipment device 102 determines that the query is not subjective. In such an example, control circuitry 204 of first user equipment device 102 may instead search a corpus of information (e.g., Wikipedia) for an answer to the query.

If, at 404, it is determined that the received query is subjective, process 400 proceeds to 408, and control circuitry 204 of first user equipment device 102 identifies a plurality of people who are qualified to answer the received query. Additional details regarding how the plurality of people qualified to answer the received query are identified are provided below in the context of FIGS. 6 and 7. In general, control circuitry 204 of first user equipment device 102 analyzes the words in the query and the social relationships between the user asking the query and their social contacts. For example, when the received query references a geographic location, control circuitry 204 of first user equipment device 102 may retrieve the geographical location information for people associated with the user seeking the answer to the query to identify a plurality of people having geographical location information matching the geographic location referenced in the received query.

At 410, control circuitry 204 of first user equipment device 102 identifies a subset of the plurality of people who are available to answer the received query. Additional details regarding how the subset of people available to answer the received query are identified are provided below in the context of FIG. 8. In general, control circuitry 204 of first user equipment device 102 retrieves the availability information of each of the plurality of people qualified to answer the received query and determines a subset of people available to answer the received query. In one such example, control circuitry 204 of first user equipment device 102 retrieves information from a calendar application stored on one or more user equipment devices associated with each of the plurality of people qualified to answer the received query to determine their availability to answer the query.

If, at 410, a person is determined to be both qualified to answer the query and available to answer the query, they are added to a subset of people at 412. At 414, control circuitry 204 of first user equipment device 102 transmits the received query to the people in the subset identified at 412. For example, control circuitry 204 of first user equipment device 102 transmits the received query to fourth user equipment device 108 in audible form and to fifth user equipment device 110 in textual form. In such an example, control circuitry 204 of first user equipment device 102 may determine the delivery method for transmitting the query based on a location and schedule of the people in the subset. For example, in the example system 100, control circuitry 204 of first user equipment device 102 may determine that Bob's son is outside and therefore deliver the received query in textual form, while delivering the received query to Bob's daughter at home in audible form. Moreover, based on the nature of the received query, control circuitry 204 may also transmit an image of the user asking the query to aid the people in the subset in answering the query.

FIG. 4 further shows that if, at 410, it is determined that none of the people qualified to answer the query are available to answer the query at the time the query is asked (NO at 410), the process proceeds to 406 and a corpus of information is searched instead. In some embodiments, control circuitry 204 may instead wait for a predetermined amount of time until at least one of the people determined to be qualified to answer the query becomes available.

At 416, control circuitry 204 of first user equipment device 102 receives and collects the responses from user equipment devices associated with the subset of people. For example, fourth user equipment device 108 and fifth user equipment device 110 receive the responses to the query from Bob's daughter and son, respectively, and transmit the responses to first user equipment device 102 via server device 101. In some embodiments, the server device 101 may be omitted and fourth user equipment device 108 and fifth user equipment device 110 may transmit the responses to the received query directly.

At 418, control circuitry 204 of first user equipment device 102 generates for display the received responses from user equipment devices associated with the subset of people who responded to the transmitted query. For example, control circuitry 204 of first user equipment device 102 may present the received responses to the user asking the question in audible form via speakers (e.g., speakers 214) of the first user equipment device 102 (e.g., a digital assistant). Alternatively, or in addition to displaying the received responses in audible form, control circuitry 204 of first user equipment device 102 may also display the received responses on one or more display screens (e.g., display 212) associated with the user seeking an answer to the query. In some embodiments, control circuitry 204 of first user equipment device 102 may collect the received responses and summarize them prior to generating a summary for display to the user asking the query. That is, if multiple responses are received that provide a similar answer, the received responses may be summarized into a single response. For example, a model may be trained to collate received responses which convey the same meaning, by either looking for synonyms or patterns in received responses. On the other hand, responses that are unique (i.e., responses that convey different information from other received responses) may be displayed without summarizing their content. In such a manner, the process 400 processes a subjective query without interrupting people who are either unqualified or unavailable to answer the query at the time the query is received.

Figure 5:
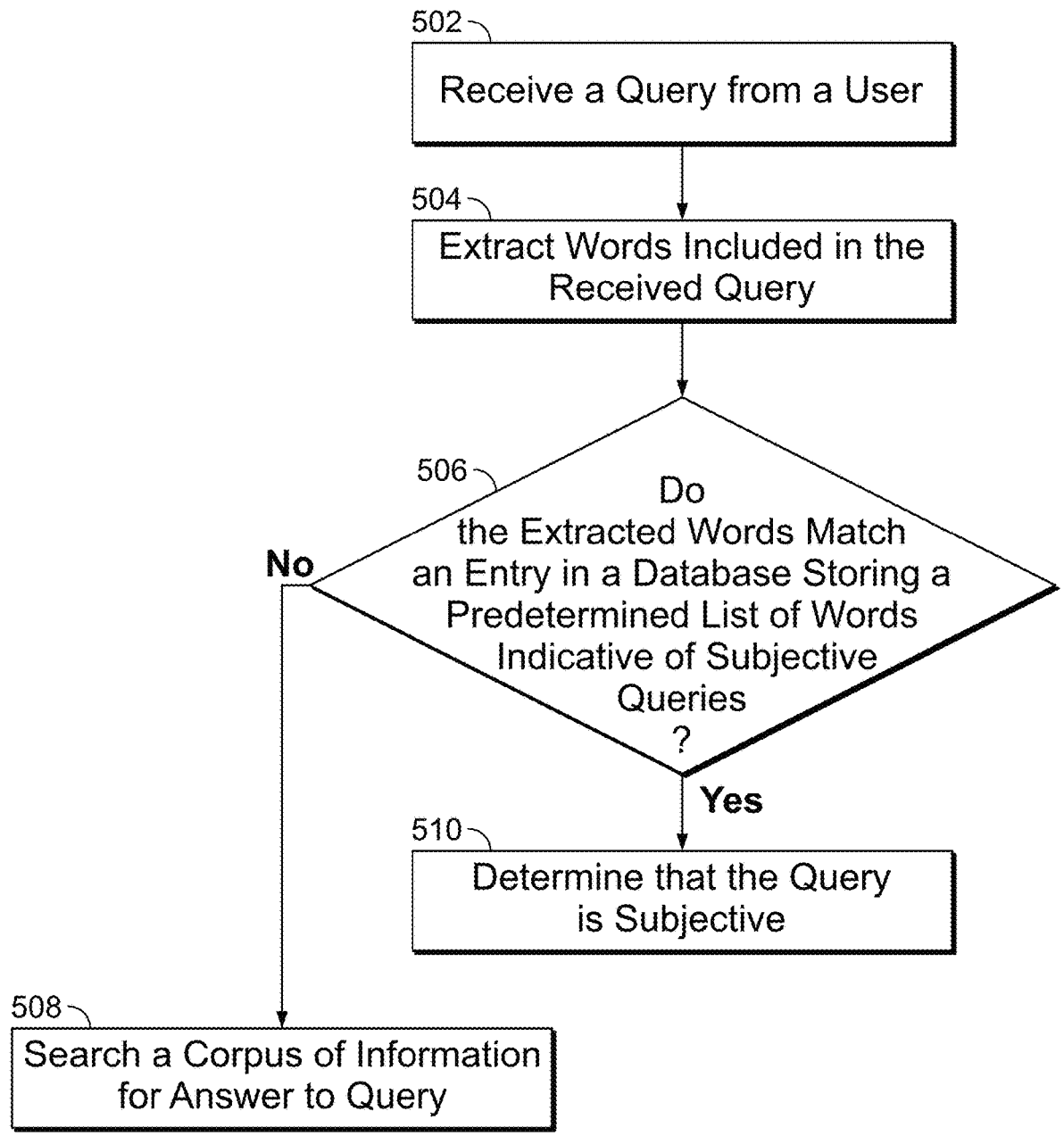
FIG. 5 depicts an illustrative flowchart of a process for determining whether a query is subjective, in accordance with some embodiments of the disclosure.

FIG. 5 depicts an illustrative flowchart of a process 404 (see FIG. 4) for determining whether a query is subjective, in accordance with some embodiments of the disclosure. At 502, a query from a user is received via control circuitry 204 of first user equipment device 102. At 504, control circuitry 204 of first user equipment device 102 extracts words from the query. For example, control circuitry 204 of first user equipment device 102 may evaluate the words in the query as well as the order of those words within the received query. At 506, control circuitry 204 of first user equipment device 102 retrieves a database (e.g., a database 900 discussed below) storing a list of words associated with subjective queries. For example, the list stored on the database may include words suggestive of opinions such as "good," "best," "like," etc., that might be understood as calling for subjective answers. Control circuitry 204 of first user equipment device 102 compares the words from the received query to the list stored on the database to identify a match.

If, at 506, control circuitry 204 of first user equipment device 102 does not identify a match between the words from the received query and the list of words stored on the database, process 404 proceeds to 508 and control circuitry 204 of first user equipment device 102 searches a corpus of information for an answer to the query. For example, control circuitry 204 of first user equipment device 102 may access a database storing information for answering objective queries. If, on the other hand, control circuitry 204 of first user equipment device 102 does identify a match between the words from the received query and the list of words stored on the database ("Yes" at 506), process 404 proceeds to 510 and control circuitry 204 of first user equipment device 102 determines the query to be subjective.

Figure 6:
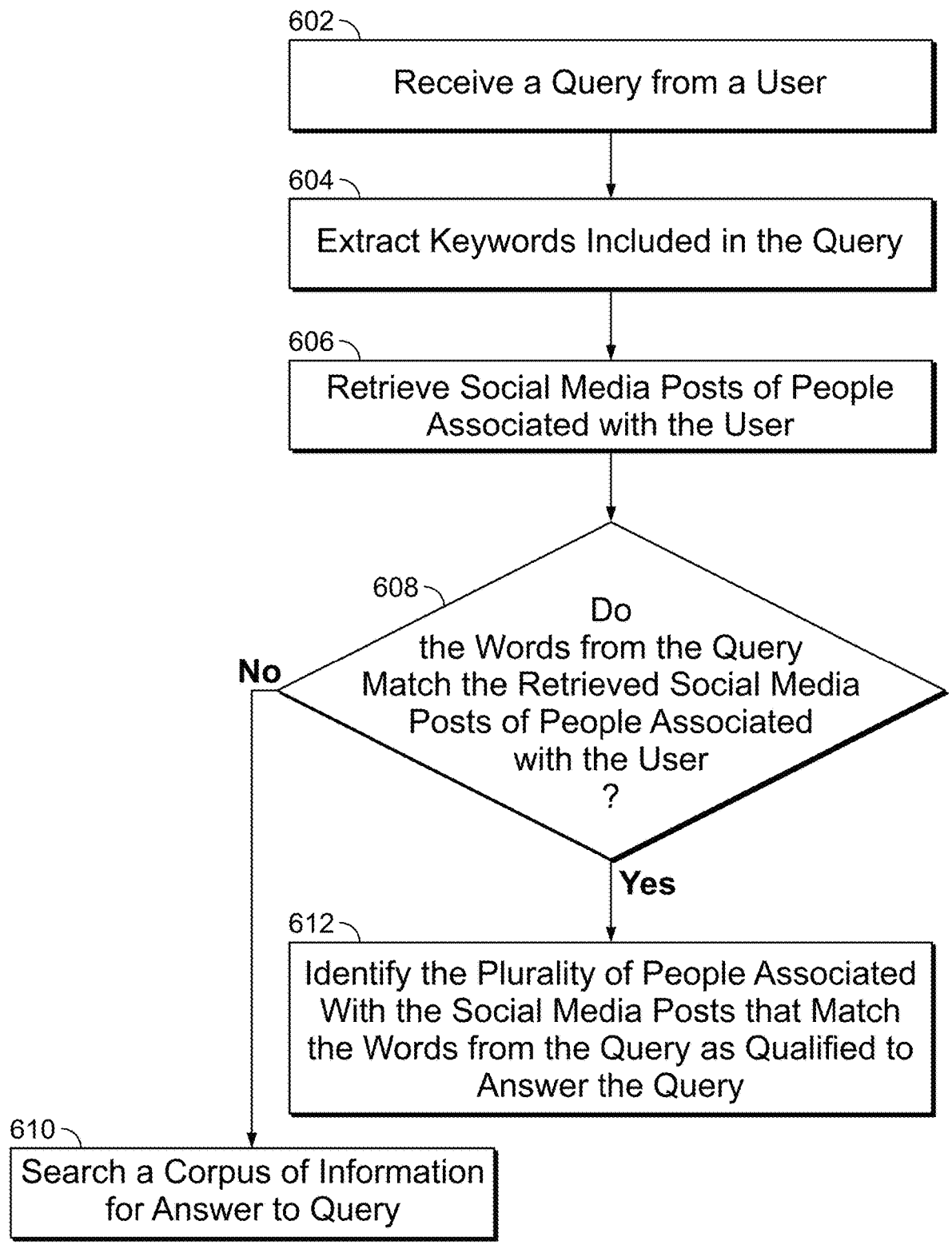
FIG. 6 depicts an illustrative flowchart of a process for identifying a plurality of people qualified to answer the subjective query, in accordance with some embodiments of the disclosure.

FIG. 6 depicts an illustrative flowchart of a process 408 (see FIG. 4) for identifying a plurality of people qualified to answer the subjective query, in accordance with some embodiments of the disclosure. At 602, a query is received via control circuitry 204 of first user equipment device 102. At 604, control circuitry 204 of first user equipment device 102 extracts the keywords from the received query as discussed above. For example, when the received query is "Should I climb Machu Pichu?" control circuitry 204 of first user equipment device 102 extracts the keywords "climb" and "Machu Pichu" from the received query. A person skilled in the art will understand that any number of methods may be used for keyword identification. For example, control circuitry 204 of first user equipment device 102 may train a classifier to identify the keywords based on user selection of answers in response to objective search queries.

At 606, control circuitry 204 of first user equipment device 102 retrieves social media posts of people associated with the user asking the query. For example, second user equipment device 104, third user equipment device 106, fourth user equipment device 108, and fifth user equipment device 110 may collect social media activity of Bob's boss, Bob's wife, Bob's daughter, and Bob's son and transmit them to either server device 101 or first user equipment device 102. In such an example, control circuitries of these user equipment devices may collect social media posts from websites such as Facebook, Twitter, Instagram, etc., associated with the respective people.

At 608, control circuitry 204 of first user equipment device 102 compares the keywords extracted from the received query to the retrieved social media posts to identify a match. For example, when the received query is "Should I climb Machu Pichu?" control circuitry 204 of first user equipment device 102 identifies any social media posts which reference the words "climbing" and/or "Machu Pichu." If control circuitry 204 of first user equipment device 102 does not identify a match between the keywords extracted from the received query and the social media posts ("No" at 608), process 408 proceeds to 610, and control circuitry 204 of first user equipment device 102 searches a corpus of information for an answer to the query. For example, control circuitry 204 of first user equipment device 102 may access a database storing information for answering objective queries. Alternatively, in some embodiments, in response to not identifying a match between the keywords extracted from the received query and the social media posts ("No" at 608), process 408 instead proceeds to 702 (discussed in more detail below in the context of FIG. 7) and attempts to identify people qualified to answer the query based on geolocation information.

If, on the other hand, control circuitry 204 of first user equipment device 102 does identify a match between the keywords extracted from the received query and the social media posts ("Yes" at 608), process 408 proceeds to 612, and control circuitry 204 of first user equipment device 102 identifies the people associated with the matching social media posts as being qualified to answer the query.

In some embodiments, control circuitry 204 of first user equipment device 102 may also limit the social media posts to those that were made within a predetermined period of time preceding the receipt of the query. For example, control circuitry 204 of first user equipment device 102 may search only social media posts made within the last three years that reference climbing and/or Machu Pichu to ensure that the query will be answered with relevant and current information.

Figure 7:
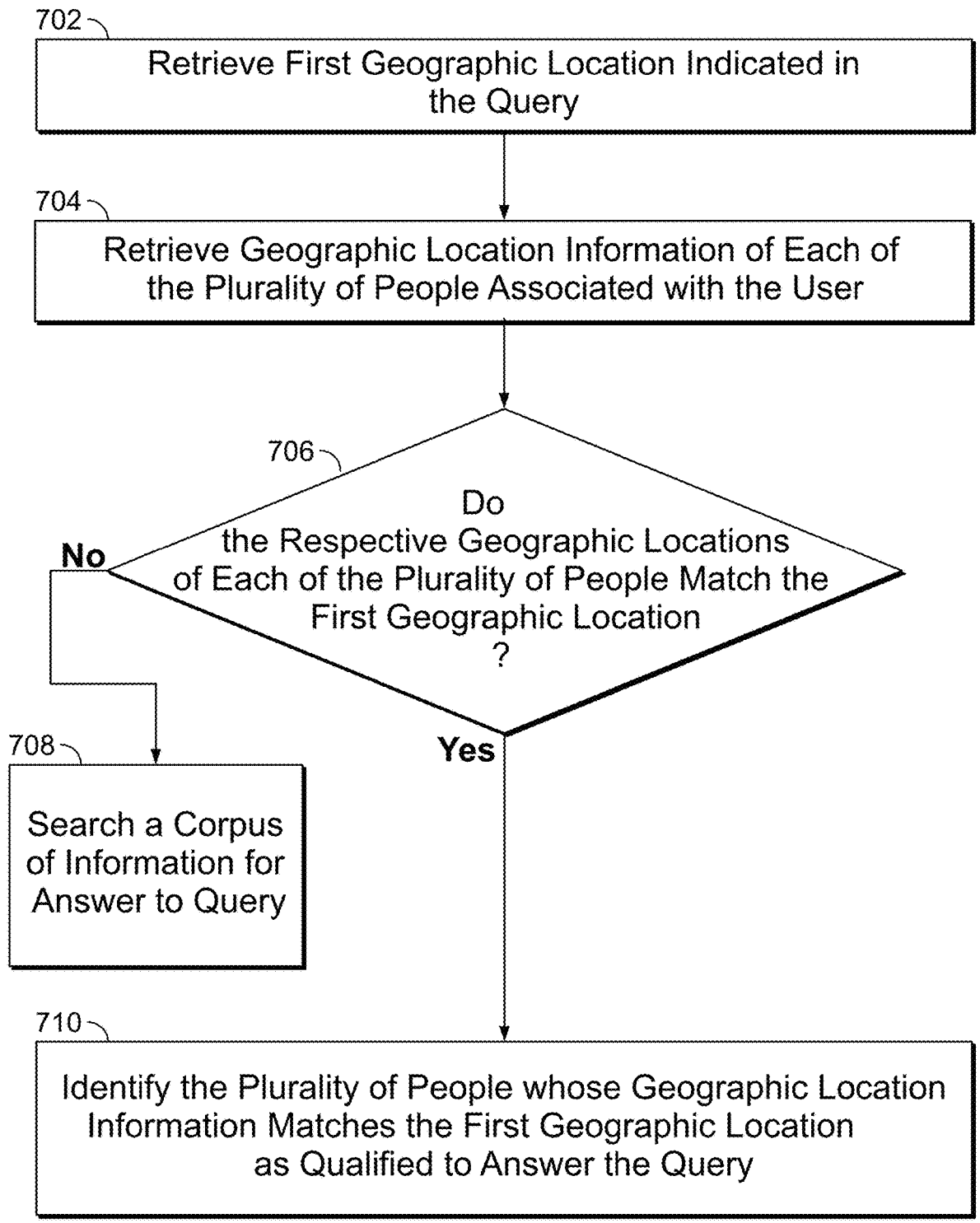
FIG. 7 depicts another illustrative flowchart of a process for identifying a plurality of people qualified to answer the subjective query, in accordance with some embodiments of the disclosure.

FIG. 7 depicts another illustrative flowchart of the process 408 for identifying a plurality of people qualified to answer the subjective query, in accordance with some embodiments of the disclosure. At 702, control circuitry 204 of first user equipment device 102 extracts a first geographic location referenced in the received query. For example, when the received query is "Should I climb Machu Pichu?" control circuitry 204 of first user equipment device 102 extracts the location "Machu Pichu" from the received query. A person skilled in the art will understand that any number of methods may be used for location identification from a received query. For example, control circuitry 204 of first user equipment device 102 may compare the words from the query to a database containing a list of geographic locations to identify a match.

At 704, control circuitry 204 of first user equipment device 102 retrieves geographic location information of people associated with the user asking the query. For example, second user equipment device 104, third user equipment device 106, fourth user equipment device 108, and fifth user equipment device 110 may collect travel activity of Bob's boss, Bob's wife, Bob's daughter, and Bob's son and transmit them to either server device 101 or first user equipment device 102. In one such example, control circuitries of these user equipment devices may collect GPS information from mobile devices associated with the respective people.

At 706, control circuitry 204 of first user equipment device 102 compares the first geographic location extracted from the received query to the retrieved geographic location information from the plurality of people to identify a match. For example, when the received query is "Should I climb Machu Pichu?" control circuitry 204 of first user equipment device 102 identifies any person who has been to Machu Pichu. If control circuitry 204 of first user equipment device 102 does not identify a match between the first geographic location extracted from the received query and the geographic location information of the plurality of people ("No" at 706), process 408 proceeds to 708 and control circuitry 204 of first user equipment device 102 searches a corpus of information for an answer to the query. For example, control circuitry 204 of first user equipment device 102 may access a database storing information for answering objective queries. Alternatively, in some embodiments, in response to not identifying a match between the first geographic location extracted from the received query and the geographic location information of the plurality of people ("No" at 706), process 408 instead proceeds to 602 (discussed in more detail above in the context of FIG. 6) and attempts to identify people qualified to answer the query based on their social media posts.

If, on the other hand, control circuitry 204 of first user equipment device 102 does identify a match between the first geographic location extracted from the received query and the geographic location information of the plurality of people ("Yes" at 706), process 408 proceeds to 710 and control circuitry 204 of first user equipment device 102 identifies the people associated with the matching geographic location information as being qualified to answer the query.

In some embodiments, control circuitry 204 of first user equipment device 102 may also limit the list of people qualified to answer the query to those that are associated with the first geographic location within a predetermined period of time preceding the receipt of the query. For example, control circuitry 204 of first user equipment device 102 may determine people to be qualified to answer the query only if they have visited Machu Pichu in the past three years to ensure that the query will be answered with relevant and current information.

In the embodiments discussed here, only those people having a first-order social connection to the user seeking the answer to the query are discussed (i.e., user has a personal direct relationship to these people). However, in various embodiments, control circuitry 204 of first user equipment device 102 may seek out second-order connections (e.g., friends or coworkers of the user's spouse) to identify people who are qualified to answer the query.

Figure 8:
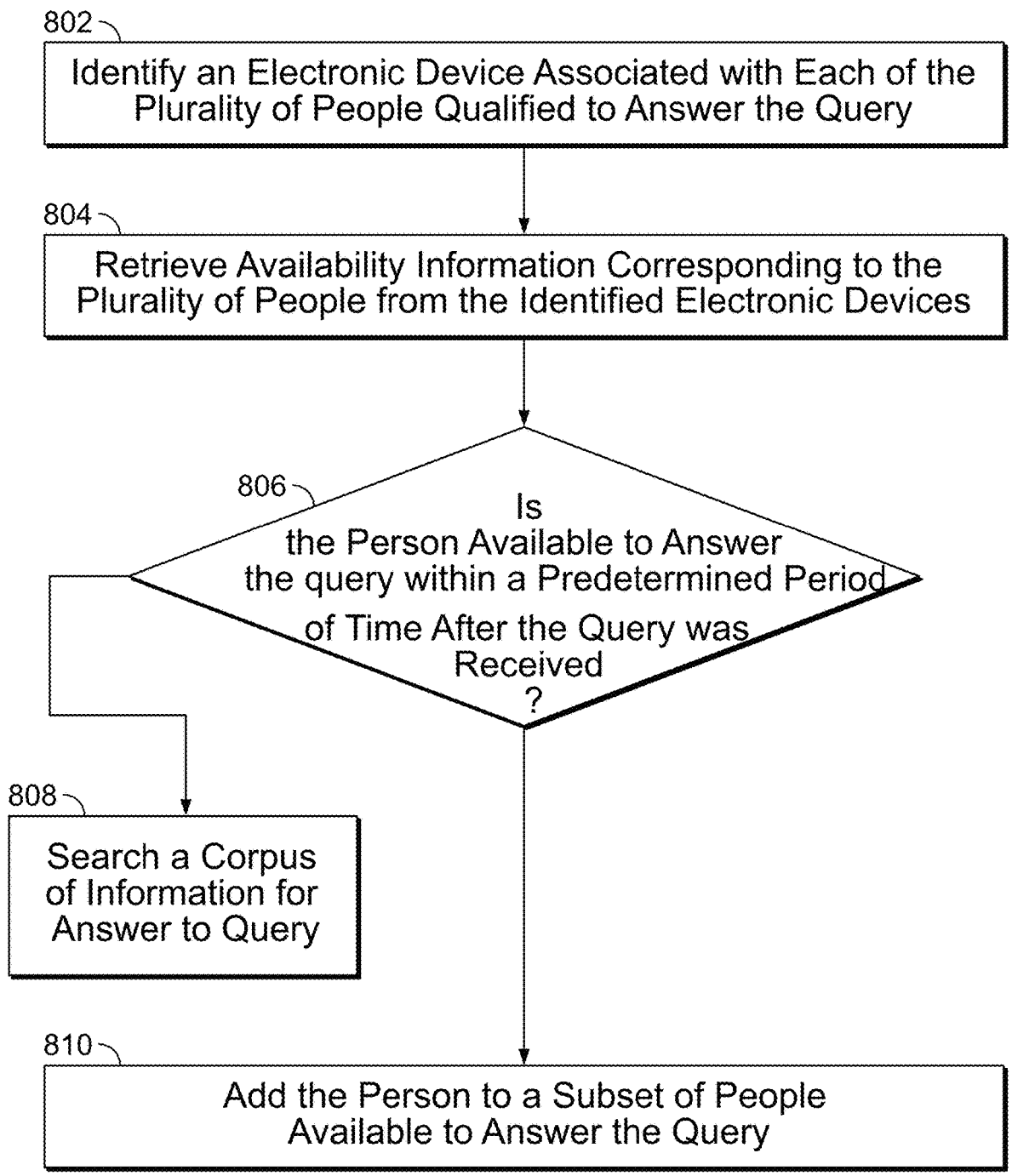
FIG. 8 depicts an illustrative flowchart of a process for identifying a plurality of people available to answer the subjective query, in accordance with some embodiments of the disclosure.

FIG. 8 depicts an illustrative flowchart of a process 410 for identifying a plurality of people available to answer the subjective query, in accordance with some embodiments of the disclosure. At 802, control circuitry 204 of first user equipment device 102 identifies an electronic device associated with each of the plurality of people qualified to answer the query. For example, control circuitry 204 of first user equipment device 102, in response to identifying Bob's wife and children as being qualified to answer the query, may identify user equipment devices 104, 108, and 110 as being associated with each of the plurality of people who are qualified to answer the query. Although the embodiment described here identifies only one user equipment device associated with each of the plurality of people qualified to answer the query, the disclosure is not so limited, and it will be understood that control circuitry 204 of first user equipment device 102 may identify any number of user equipment devices associated with the plurality of people qualified to answer the query.

At 804, control circuitry 204 of first user equipment device 102 retrieves availability information corresponding to the plurality of people qualified to answer the query from the identified user equipment devices. For example, control circuitry 204 of first user equipment device 102 may retrieve availability information from second user equipment device 104, fourth user equipment device 108, and fifth user equipment device 110 corresponding to Bob's wife, Bob's daughter, and Bob's son via server device 101. In some embodiments, control circuitries of these user equipment devices may collect availability information from a calendar application stored on their respective mobile devices. In the example scenario illustrated in FIG. 1, second user equipment device 104 is a digital assistant that may collect availability information for Bob's wife from a calendar application from a mobile device belonging to Bob's wife. In another embodiment, availability information for the plurality of people qualified to answer the query may be inferred based on a current location of the plurality of people. In some embodiments, the retrieved availability information may also include capability information associated with the identified user equipment devices of the plurality of people. For example, in a scenario where Bob's daughter is both qualified and otherwise available to answer the query, but does not have access to a user equipment device capable of displaying an image, control circuitry 204 of first user equipment device 102 may exclude Bob's daughter from the subset of people who are considered available.

At 806, control circuitry 204 of first user equipment device 102 determines whether the person is available to answer the query within a predetermined period of time after the query was received, based on the retrieved availability information. For example, control circuitry 204 of first user equipment device 102 may obtain location information from a user equipment device associated with Bob's wife and, in response to determining that she is at her office, determine that she is unavailable to answer the query. In some embodiments, control circuitry 204 of first user equipment device 102 may review the retrieved calendar information to determine availability of the plurality of people. For example, control circuitry 204 of first user equipment device 102 may determine that Bob's wife is scheduled to be in a meeting when Bob asks the query and therefore should not be interrupted with the query for the duration of the meeting.

If control circuitry 204 of first user equipment device 102 does not identify any person who is available to answer the query at the time ("No" at 806), process 410 proceeds to 808 and control circuitry 204 of first user equipment device 102 searches a corpus of information for an answer to the query. For example, control circuitry 204 of first user equipment device 102 may access a database storing information for answering objective queries. If, on the other hand, control circuitry 204 of first user equipment device 102 does identify people who are available to answer the query ("Yes" at 806), process 410 proceeds to 810 and control circuitry 204 of first user equipment device 102 identifies the subset of people available to answer the query.

The processes discussed above refer to searching a corpus of information (e.g., a web search) a number of times in the context of FIG. 4 (at 406), 5 (at 508), 6 (at 610), 7 (at 708), and 8 (at 808). A person possessing ordinary skill in the art will understand that the processes described in FIGS. 4-8 may be combined with each other. That is, the system would search the corpus of information for a query determined to be subjective only if: (i) none of the people within the user's social circle are qualified to answer the query (NO at 608 and NO at 706); or (ii) none of the plurality of people determined to be qualified to answer the query are available (NO at 410 and NO at 806). For instance, in the case where the extracted geolocation from the received query does not match the geographical information for any of the plurality of people in the user's social circle (e.g., one or more people within the user's social may not have made their geographical information available for comparison), the system may instead search the social media posts of these people which reference the geographical location included in the received query.

Figure 9:
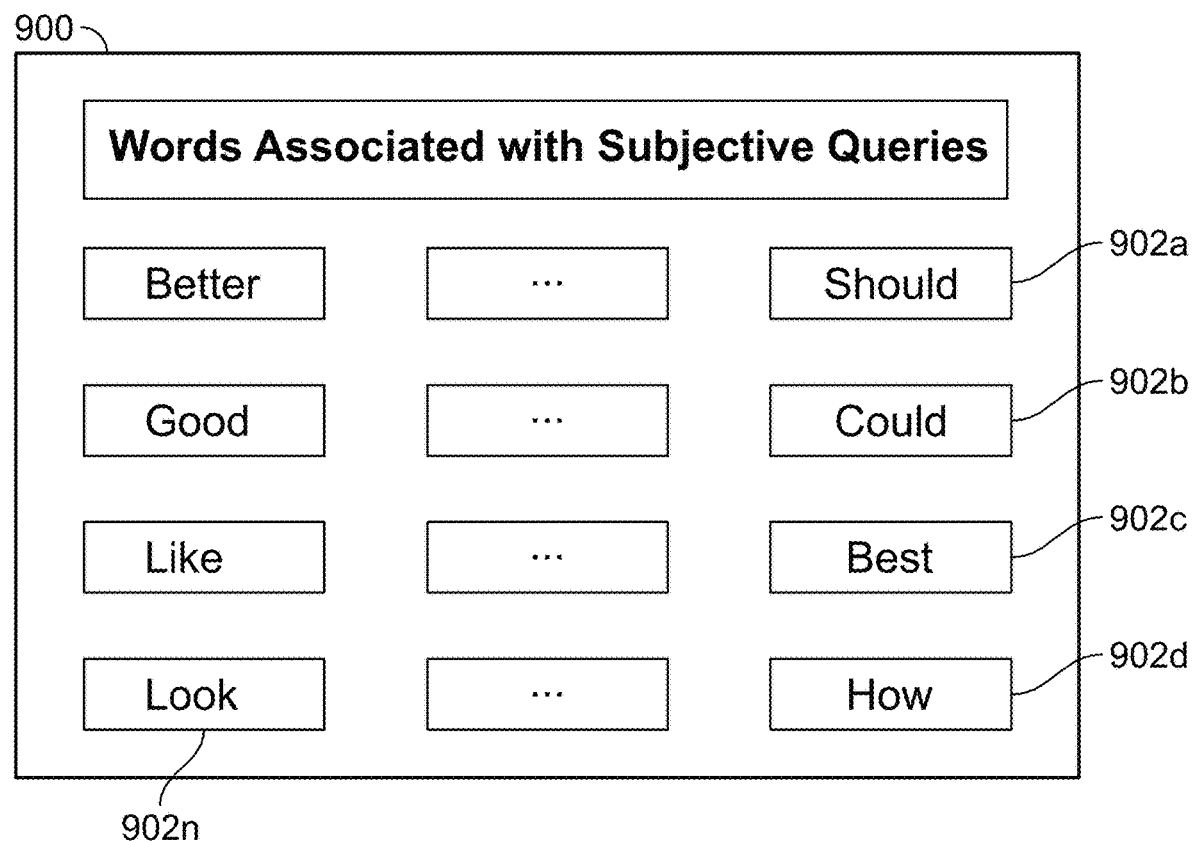
FIG. 9 depicts an illustrative database storing a list of words indicative of subjective queries, in accordance with some embodiments of the disclosure.

FIG. 9 depicts an illustrative database 900 storing a list of words indicative of subjective queries, in accordance with some embodiments of the disclosure. As illustrated in FIG. 9, a database 900 includes a plurality of entries 902a, 902b, . . . 902n listing words indicative of subjective queries. As will be readily apparent to a person skilled in the art, the list of words shown in FIG. 9 is not exhaustive and is for illustrative purposes only. In various embodiments, the database 900 may be stored at one or more of server device 101 and first, second, third, fourth, and fifth user equipment devices 102-110, and may be accessible by any other user equipment device communicatively coupled to the other user equipment devices. In some embodiments, control circuitry 204 of first user equipment device 102 is configured to add words to the database 900 based on user interaction with objective search results. For example, when a user inputs a query but is unsatisfied with the search results (e.g., by monitoring user interaction with the search results to identify frustration with the search results), control circuitry 204 of first user equipment device 102 may add the words from the query as being associated with subjective queries.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 400, 500, 600, and 800 can be performed on any of the devices shown in FIGS. 1-3. Additionally, any of the steps in processes 400, 500, 600, and 800 can be performed in any order, can be omitted, and/or can be combined with any of the steps from any other process.

While some portions of this disclosure may refer to "convention," any such reference is merely for the purpose of providing context to the invention(s) of the instant disclosure, and does not form any admission as to what constitutes the state of the art.

What is claimed is:

1. A method comprising:
receiving, at a first device, a voice query associated with a first user profile;
determining whether the voice query is subjective;
in response to determining the voice query is subjective, identifying one or more people who are qualified to answer the voice query based on a social relationship with the user by:
identifying a second user profile from a social media service associated with the first user profile, wherein the second user profile is associated with the first user profile;
determining whether the second user profile satisfies a qualification for answering the voice query;
in response to determining that the second user profile satisfies the qualification for answering the voice query:
determining whether the second user profile is available for answering the voice query; and
in response to determining the second user profile is available for answering the voice query:
transmitting the voice query to a second device associated with the second user profile;
receiving a response to the voice query from the second user profile; and
generating for output the response via the first device; and
either in response to determining the voice query is not subjective or in response to determining the second user profile is not available for answering the voice query, searching a corpus of information for an answer to the voice query.

2. The method of claim 1, wherein the determining whether the query is subjective comprises:
   extracting words included in the voice query;
   comparing the extracted words against a database storing a predetermined list of words associated with subjective requests to identify a match; and
   in response to identifying a match, determining that the voice query is subjective.

3. The method of claim 1, wherein the determining whether the second user profile satisfies the qualification for answering the voice query comprises:
   extracting words included in the voice query;
   comparing the extracted words from the voice query to a social media post associated with the second user profile to identify a match; and
   in response to identifying the match, identifying the second user profile as qualified to answer the voice query.

4. The method of claim 1, wherein the determining whether the second user profile satisfies the qualification for answering the voice query comprises:
   identifying a first geographic location indicated in the voice query;
   retrieving a second geographic location associated with the second user profile;
   determining whether the second geographic location matches the first geographic location; and
   in response to determining the second geographic location matches the first geographic location, identifying the second user profile as qualified to answer the voice query.

5. The method of claim 1, comprising:
   wherein the determining whether the second user profile is available for answering the voice query includes:
      retrieving availability information corresponding to the second user profile;
      analyzing the retrieved availability information to determine whether the second user profile that is available; and
      in response to determining the second user profile is available, determining a predetermined period of time of availability.

6. The method of claim 5, wherein the availability information includes at least one of information related to a location associated with the second user profile, information related to a schedule associated with the second user profile, or information related to a capability of the second device associated with the second user profile.

7. The method of claim 5, wherein the transmitting the voice query to the second device associated with the second user profile comprises:
   selecting a delivery method from a plurality of delivery methods for transmitting the voice query to the second user profile, wherein the selection is made based at least in part on the determined availability of the second user profile; and
   transmitting the voice query to the second device via the selected delivery method.

8. The method of claim 7, wherein the delivery method is selected based at least in part on a type of the second device associated with the second user profile.

9. The method of claim 1,
   wherein the receiving a response to the voice query from the qualified second user profile comprises:
      receiving a plurality of responses to the voice query from a plurality of second user profiles associated with the first user profile; and
      generating a summary of the plurality of received responses, and
   wherein the generating for output the response on the first device comprises:
      generating for display the generated summary as the received response to the voice query on the first device associated with the first user profile.

10. The method of claim 1, wherein the generating for output the response on the first device comprises:
    announcing, via a digital assistant associated with the first user, the response to the voice query.

11. A system comprising:
    input-output circuitry;
    a memory storing instructions; and
    processing circuitry communicably coupled to the memory and the input-output circuitry and configured to execute the instructions to:
       receive a voice query associated with a first user profile stored in the memory;
       determine whether the voice query is subjective;
       in response to determining the voice query is subjective, identify one or more people who are qualified to answer the voice query based on a social relationship with the user by:
          identifying a second user profile from a social media service associated with the first user profile, wherein the second user profile is associated with the first user profile;
          determining whether the second user profile satisfies a qualification for answering the voice query;
          in response to determining that the second user profile satisfies the qualification for answering the voice query:
             determining whether the second user profile is available for answering the voice query; and
             in response to determining the second user profile is available for answering the voice query:
                transmitting the voice query to a second device associated with the second user profile;
                receiving a response to the voice query from the qualified second user profile; and
                generating for output the response; and
       either in response to determining the voice query is not subjective or in response to determining the second user profile is not available for answering the voice query, search a corpus of information for an answer to the voice query.

12. The system of claim 11, wherein the processing circuitry configured to execute the instructions to determine whether the query is subjective is further configured to:
    extract words included in the voice query;
    compare the extracted words against a database storing a predetermined list of words associated with subjective requests to identify a match; and
    in response to identifying a match, determine that the voice query is subjective.

13. The system of claim 11, wherein the processing circuitry configured to execute the instructions to determine whether the second user profile satisfies the qualification for answering the voice query is further configured to:
    extract words included in the voice query;
    compare the extracted words from the voice query to a social media post associated with the second user profile to identify a match; and
    in response to identifying the match, identify the second user profile as qualified to answer the voice query.

14. The system of claim 11, wherein the processing circuitry configured to execute the instructions to determine whether the second user profile satisfies the qualification for answering the voice query is further configured to:
- identify a first geographic location indicated in the voice query;
- retrieve a second geographic location associated with the second user profile;
- determine whether the second geographic location matches the first geographic location; and
- in response to determining the second geographic location matches the first geographic location, identify the second user profile as qualified to answer the voice query.

15. The system of claim 11, wherein the processing circuitry configured to determine whether the second user profile is available for answering the voice query is configured to:
- retrieve availability information corresponding to the second user profile;
- analyze the retrieved availability information to determine whether the second user profile that is available; and
- in response to determining the second user profile is available, determine a predetermined period of time of availability.

16. The system of claim 15, wherein the availability information includes at least one of information related to a location associated with the second user profile, information related to a schedule associated with the second user profile, or information related to a capability of the second device associated with the second user profile.

17. The system of claim 15, wherein the processing circuitry configured to execute the instructions to transmit the voice query to the second device associated with the second user profile is further configured to:
- select a delivery system from a plurality of delivery systems for transmitting the voice query to the second user profile, wherein the selection is made based at least in part on the determined availability of the second user profile; and
- transmit the voice query to the second device via the selected delivery system.

18. The system of claim 17, wherein the delivery system is selected based at least in part on a type of the second device associated with the second user profile.

19. The system of claim 11,
wherein the processing circuitry configured to execute the instructions to receive a response to the voice query from the qualified second user profile is further configured to:
- receive a plurality of responses to the voice query from a plurality of second user profiles associated with the first user profile; and
- generate a summary of the plurality of received responses, and wherein the processing circuitry configured to execute the instructions to generate for output the response is further configured to:
- generate for display the generated summary as the received response to the voice query.

20. The system of claim 11, wherein the processing circuitry configured to execute the instructions to generate for output the response is further configured to:
- announce, via a digital assistant associated with the first user, the response to the voice query.

\* \* \* \* \*